United States Patent [19]

Naber et al.

[11] 3,924,024

[45] Dec. 2, 1975

[54] PROCESS FOR FABRICATING MNOS NON-VOLATILE MEMORIES

[75] Inventors: Charles T. Naber, Centerville; William F. Blust, Middletown, both of Ohio

[73] Assignee: NCR Corporation, Dayton, Ohio

[22] Filed: Apr. 2, 1973

[21] Appl. No.: 347,155

[52] U.S. Cl. .................... 427/95; 427/94; 427/377; 427/378; 427/399; 427/419

[51] Int. Cl.$^2$ ........................ B05D 5/12; B05D 3/04

[58] Field of Search ....... 117/201, 213, 215, 106 A, 117/DIG. 12; 427/377, 378, 399, 94, 95

[56] References Cited

UNITED STATES PATENTS

| | | | |
|---|---|---|---|
| 3,385,729 | 5/1968 | Larchian | 117/DIG. 12 |
| 3,520,722 | 7/1970 | Scott | 117/213 |
| 3,540,926 | 11/1970 | Rairden, III | 117/DIG. 12 |
| 3,592,707 | 7/1971 | Jaccodine | 117/215 |
| 3,597,667 | 8/1971 | Horn | 117/215 |
| 3,649,886 | 3/1972 | Kooi | 117/215 |
| 3,765,935 | 10/1973 | Rand | 117/201 |
| 3,798,061 | 3/1974 | Yamazaki | 117/213 |

*Primary Examiner*—Michael F. Esposito
*Attorney, Agent, or Firm*—J. T. Cavender; Lawrence P. Benjamin

[57] ABSTRACT

The switching speed of an MNOS field effect transistor is increased by a heat treatment in an ammonia rich atmosphere during processing. The transistor has an insulated gate structure comprising a layer of silicon nitride deposited on a layer of silicon oxide. After the formation of the silicon oxide layer and immediately prior to the formation of the silicon nitride layer on a surface thereof, the surface of the silicon oxide layer is heat treated in an ammonia enriched atmosphere to remove substantially all remaining oxygen atoms and molecules absorbed on the surface.

14 Claims, 6 Drawing Figures

PROCESS FOR FABRICATING MNOS NON-VOLATILE MEMORIES

BACKGROUND OF THE INVENTION

In memory devices it is desirable to utilize MNOS field effect transistors which have the highest magnitude of switching speeds in order to enable the memory device to perform as many operations as possible within a given time period. To date, efforts to further increase the switching speed of MNOS transistors have included the use of high purity gases, better cleaning procedures for substrate surfaces before and during manufacturing runs and better design parameters.

Unexpectedly it has been found that switching speeds can be improved by a particular heat treating process during fabrication. For an IGFET having an insulated gate comprising a layer of silicon nitride formed on a surface of a layer of silicon oxide, the surface of the silicon oxide layer is subjected to a heat treatment in an ammonia enriched atmosphere. In the process, which is not fully understood, it is believed that this heat treatment removes substantially all oxygen atoms and/or molecules on the surface and replaces them with nitrogen atoms, nitrogen molecules, ammonia radicals, and/or hydroxyl radicals. Subsequently, when the silicon nitride is grown on the surface of the silicon oxide, an oxynitride nitride layer which previously was apparently formed heretofore does not occur.

An object of this invention is to provide an MNOS field effect transistor having a substantially improved switching speed.

Another object of this invention is to provide an insulated gate field effect transistor having a gate structure comprising a layer of silicon nitride disposed on a layer of silicon oxide, the interface between the layers being free of any oxynitride material and exhibiting a sharp transistion between the two layers.

A further object of this invention is to provide an improved process for making insulated gate field effect transistors.

A still further object of this invention is to provide a process for heat treating a surface of the silicon oxide in an ammonia enriched atmosphere prior to the depositing of a layer of silicon nitride thereon to substantially increase the switching speed of an insulated gate field effect transistor embodying such a structure relative to the switching speeds of prior art transistors of the same configuration.

SUMMARY OF THE INVENTION

In accordance with the teachings of this invention there is provided a process for fabricating a silicon oxide-silicon nitride semiconductor device. A layer of silicon oxide is grown on a selected surface area of a body of semiconductor material. At least that surface of the layer of silicon oxide upon which a layer of silicon nitride is to be deposited is heat treated at an elevated temperature in an ammonia enriched atmosphere for a sufficient period of time to remove substantially all of the oxygen absorbed on that surface of the silicon oxide layer. A layer of silicon nitride is then immediately deposited on the heat treated surface of the layer of silicon oxide. Suitable gases for use in the heat treating process are ammonia and hydrazine. The heat treating temperature is preferably the same temperature at which the layer of silicon nitride is grown.

DESCRIPTION OF THE PREFERRED EMBODIMENT

Figure 4:
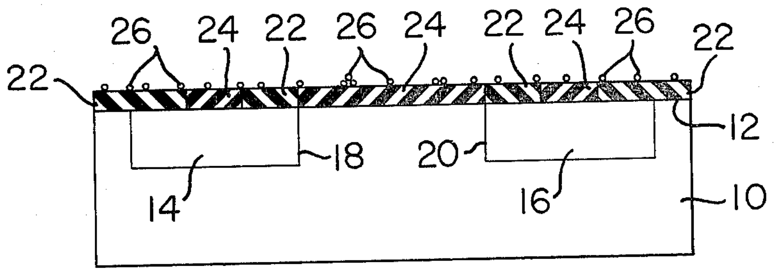
FIGS. 4 through 6 are elevation views, in crosssection, of a body of semiconductor material processed in accordance with the teachings of this invention.

With reference to FIG. 4 there is shown a body 10 of semiconductor material which is to be processed into an insulated gate field effect transistor (IGFET). The body 10 comprises a material which is suitable for the formation of an insulated gate comprising silicon oxide and silicon nitride to be formed on a major surface 12 thereof. Such suitable materials are silicon, silicon carbide and compounds of Group III and Group V elements of the Periodic Table and compounds of Group II and Group VI of the Periodic Table. In order to describe the invention in particular, and for no other reason, the body 10 is described as being of silicon semiconductor material and having n-type conductivity.

Two regions 14 and 16 of opposite type (p-type) conductivity are formed in the body 10 by such suitable means as diffusion and the like. The interface of the regions 14 and 16 with the material of the body 10 form respective p-n junctions 18 and 20. A layer 22 of silicon oxide, usually in the form of silicon dioxide, is formed on surface 12 by such suitable means as by thermal oxidation of the body 10 and the like. Windows are formed in the layer 22 to expose selected areas of the surface 12 of body 10. These windows are formed by suitable means such, for example, as by photolithographical techniques and selective etching to expose selective areas of the surface 12. Boron is deposited on the selected surface areas in the window and diffused into the body 10. If required, the thickness of the layer 22 may be increased by repeating or employing a new oxidation process step. The oxide mask is removed from the area of the surface 12 between the regions 14 and 16. It is to be noted that the steps in processing the body 10 to this point are well known to those skilled in the art and do not constitute any portion of applicant's invention.

The processed body 10 is placed in a suitable reactor such, for example, as one suitable for the growth of oxides, nitrides, epitoxial materials and the like. Preferably, a reactor which can be sequentially evacuated, flushed, and also have the capability of withstanding pressure greater than atmospheric pressure is desirable. A suitable reactor 50 is shown in FIG. 1.

Figure 1:
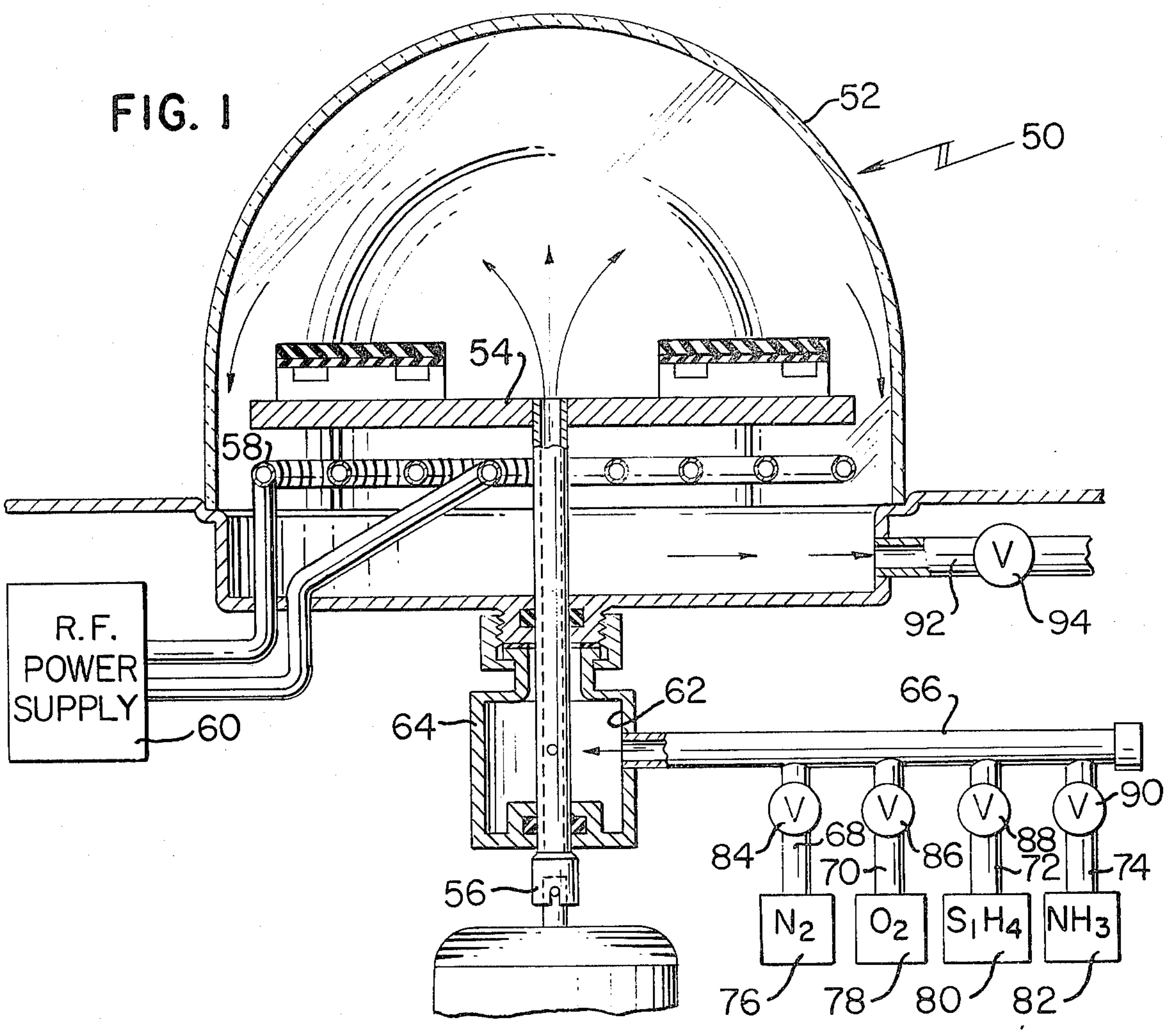
FIG. 1 is an elevation view, partly in cross-section of apparatus suitable for embodying the teachings of this invention.

With reference to FIG. 1, the reactor 50 comprises a reaction chamber 52 within which is located a susceptor 54 having rotatable means 56 for rotation about the vertical axis of the chamber 52. Beneath the susceptor 54 is located resistive means 58 such, for example, as radio frequency induction coils, connected to a radio frequency power supply 60 for heating the susceptor 54 and any substrate disposed thereon. Inlet means 62 including a chamber 64 and a first manifold 66 are provided for introducing gaseous materials into the chamber 52. Connected to the manifold 66 are a plurality of inlet tubes 68, 70, 72 and 74 each connected to respective sources 76, 78, 80 and 82 of gaseous materials. The control of the flow of gaseous materials through the inlet tubes 68, 70, 72 and 74 to the manifold 66 is regulated by the respective control valves 84, 86, 88 and 90 installed therein. A second manifold 92 including a valve 94 controls the flow of gaseous material from the chamber 52.

One or more of the processed body 10 of FIG. 4 is disposed within the interior of the reactor 50 on the rotating susceptor 54. Valves 84 and 94 are opened and the interior of the chamber 52 and the exposed surfaces of the body 10 are flushed with an inert gas such, for example, as nitrogen gas from the source 26. Flushing of the chamber 52 is continued for a sufficient time to purge the reactor system — manifolds 66 and 92 and chambers 52 and 64 in particular — of all possible extraneous sources of possible growth imperfections and oxidation materials of the material comprising the body 10 disposed within the chamber 52. A period of approximately 2 minutes has been found to be sufficient to purge a normal commercial size epitaxial growth production reactor. Other suitable inert gases for flushing the chamber 52 are argon, helium, hydrogen and the like.

During flushing of the chamber 52, the RF power supply 60 is energized and the thermal energy of the coils 58 connected thereto causes the susceptor and body(s) 10 disposed thereon to be heated to a temperature range for the growth of the layer of silicon oxide. The pressure within the chamber 52 is also adjusted to be slightly greater than atmospheric pressure. This pressure adjustment is to prevent any ambient external to the chamber 52 from being drawn into the chamber and possibly be deleterious to the oxide growth process and the finished device characteristics. Additionally, the pressure within the chamber 52 is sufficient to cause a sufficient flow of gas or gases within the chamber 52 for good mixing action therein and about at least the exposed selected areas of the surface 12 of the body 10.

Silicon oxide may be grown by oxidation of the material of body 10 comprising at least selected exposed areas of the surface 12 in a temperature range of from approximately 700°C to approximately 1100° C in the presence of oxygen. A preferred manner of growing a desired thin layer 24 of silicon oxide on selected areas of the surface 12 of the body 10 is adequately described in U.S. Pat. No. 3,647,535 and is incorporated herein by reference thereto. Other methods known to those skilled in the art such, for example, as the thermal oxidation of the body 10 in wet oxygen may also be employed to grow the layer 24. Preferably the temperature, or temperature range, selected for the oxidation process is one which causes little or no further diffusion of the dopant material (boron) into the body 10 thereby appreciably enlarging the regions 14 and 16. Very little, if any, growth of additional silicon oxide occurs in the remaining portions of the layer 22 of silicon oxide employed heretofore as a diffusion mask.

Upon completion of the purging of the chamber 52 and having raised the body 10 to the oxide growth temperature range, the valve 86 is opened. Oxygen from the source 78 is introduced into the nitrogen gas stream in a sufficient quantity to grow the layer 24 of silicon oxide on the body 10. Little if any further growth of the silicon oxide layer 22 occurs.

Figure 5:
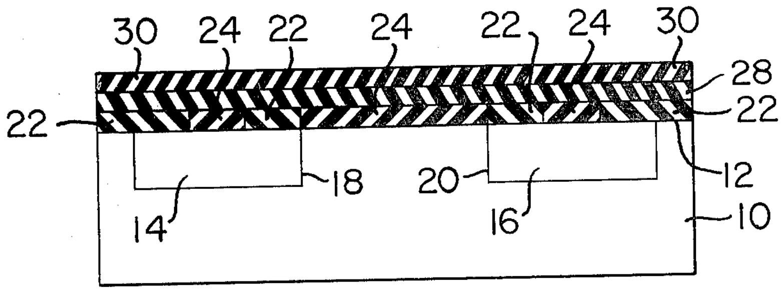
Figure 6:
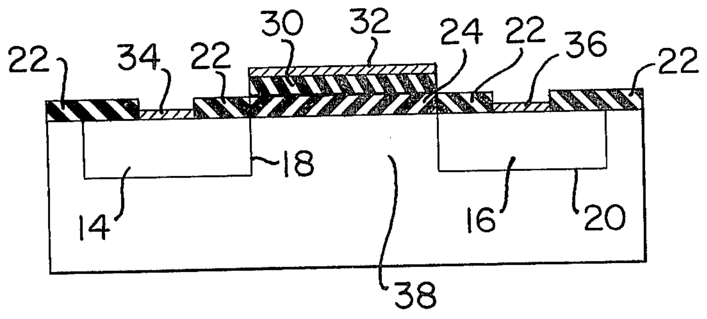

Upon completion of the growth of the silicon oxide layer 24, it has been discovered that if the reactor interior 52 is purged again of all possible sources of oxidation or imperfections in the layers grown, rather than beginning a nitride deposition process immediately, that a significant improvement in the switching speed of the IGFET is obtained. The purging of the interior of the chamber 52 is accomplished with an ammonia enriched atmosphere. This is contrary to the prior art procedure wherein upon completion of the growth of the layer 22, the oxide growing gas mixture is shut off and replaced immediately by a new mixture of gases which will deposit silicon nitride on the layer 22. However, it has been discovered that the process of growing the oxide layer 22 apparently leaves an extraneous product which is detrimental to the switching speed characteristics of the completed IGFET. It appears that oxygen in the form of individual, or clusters of two or more atoms and/or molecules 26 are trapped, or absorbed at, the surface 28 of both of the oxide layers 22 and 24 by such means which are not fully understood at this time. Therefore, when the gaseous mixture to deposit silicon nitride on the oxide layers 22 and 24 is caused to flow over the layers 22 and 24 it appears that the trapped individual, or clusters of, atoms and molecules of oxygen react with this gaseous mixture and deposit a layer 28 of an oxynitride material on the silicon oxide layers 22 and 24. When all the available oxygen has been used up, a layer 30 of silicon nitride is then deposited on the oxynitride layer 28. The layer 28 apparently is only one, two or possibly three atoms in thickness. But its presence is sufficient to appreciably affect the switching speed of the completed IGFET. The completed structure is as shown in FIG. 5.

If, however, upon completing the growth of the layer 24 of silicon oxide, one causes an ammonia enriched gas to flow throughout the interior of the furnace and over and about the surface of the processed body 10, substantially, if not all, of the oxygen 26 absorbed in whatever form it might be, on the surface of the layers 22 and 24 of silicon oxide (FIG. 4) is replaced by individual or clusters of atoms and/or molecules of ammonia enriched materials and oxygen radicals which later are expelled as a gaseous product and do not form an apparent oxynitride product on the oxide layer. Therefore, when the silicon nitride forming gases are introduced, the trapped ammonia enriched material reacts with the gaseous mixture to begin the silicon nitride deposition and the oxynitride interface is eliminated. Preferably for the ease of process operation, the ammonia enriched atmosphere is provided by the nitrogen compound employed in the growth of the silicon nitride layer. For example, ammonia gas is commonly employed with a suitable silicon being gaseous compound to grow silicon nitride layer. Similarly, hydrazine gas may also be employed provided the temperature for growing the silicon nitride layer exceeds that temperature, approximately 350° C, at which hydrazine decomposes into nitrogen and ammonia.

Preferably, the flow of inert gas, in particular, the flow of nitrogen, is continued throughout the entire process, including purging. This preference for the continued inert gas flow is to enable one to employ the inert gas as a carrier gas for the ammonia or ammonia enriched compound and the silicon enriched compound. Therefore, after the silicon oxide growth is completed, the chamber 52 may be purged with an inert gas such, for example, as nitrogen for a period of time of approximately two minutes and the body 10 raised to the temperature for depositing the silicon nitride layer. While continuing the inert gas flow, the ammonia or ammonia enriched compound is introduced into the inert gas flow and hence the chamber. The flow of the ammonia or the ammonia enriched compound is continued for a predetermined period of time before initiating the deposition of the silicon nitride layer.

During the purging and heat treating process employing the ammonia enriched gas, the temperature of the processed body 10 is adjusted to that temperature at which the silicon nitride layer is to be deposited on the layers 22 and 24. Preferably, the temperature of the body 10, is brought to the silicon nitride deposition temperature at the beginning of the purging and heat treating cycle. Upon completion of the purging of the reactor chamber 52, and the heat treating of the surfaces of the processed body 10 disposed therein, a gaseous material which is suitable for producing the silicon of the silicon nitride layer is introduced into the ammonia enriched gas from the source 80 via the inlet tube 72 and regulated by the valve 88. Alternately, a mixture of gases suitable for depositing a silicon nitride layer 30, is introduced into the chamber 52 and the purging gas acts as a diluent therefor. As indicated in FIG. 1, a suitable gaseous mixture for growing the silicon nitride layer 30 (FIG. 5) is one comprising silane and ammonia. Other suitable silicon nitride forming gaseous mixtures are silicon tetrachloride and ammonia, silane and hydrazine and dichlorosilane and ammonia. Suitable carrier and/or diluent gases are hydrogen and nitrogen. Upon completion of the deposit of the layer 30 of silicon nitride, the power supply 60 is turned off, the processed body cooled, preferably in an inert gas, to room temperature, the valves 84 through 90 are closed and the processed body 10 is removed from the apparatus 50.

Employing suitable photolithographical techniques, selective etching techniques and metal deposition techniques, and IGFET, the structure of which is as shown in FIG. 5 is completed. The IGFET has an electrical contact affixed to the layer 30 of silicon nitride grown on the layer 24 of silicon oxide grown on the surface of the channel region 38 of the IGFET. Electrical contacts 34 and 36 are affixed to selected surface areas of the respective regions 14 and 16.

As shown in FIG. 5, the IGFET comprises a layer 30 of silicon nitride deposited directly on the layer 24 of silicon oxide. There is no oxynitride interface between the two layers. An abrupt interface exists between the two layers 24 and 30. The IGFET as shown and made in accordance with the teachings of this invention exhibits a substantial increase in desirable electrical characteristics when compared to prior art devices. For example, the switching speed of an IGFET made in accordance with the teachings of this invention has a switching speed which is about ten times faster than the switching speeds of devices made by the prior art method.

Figure 2:
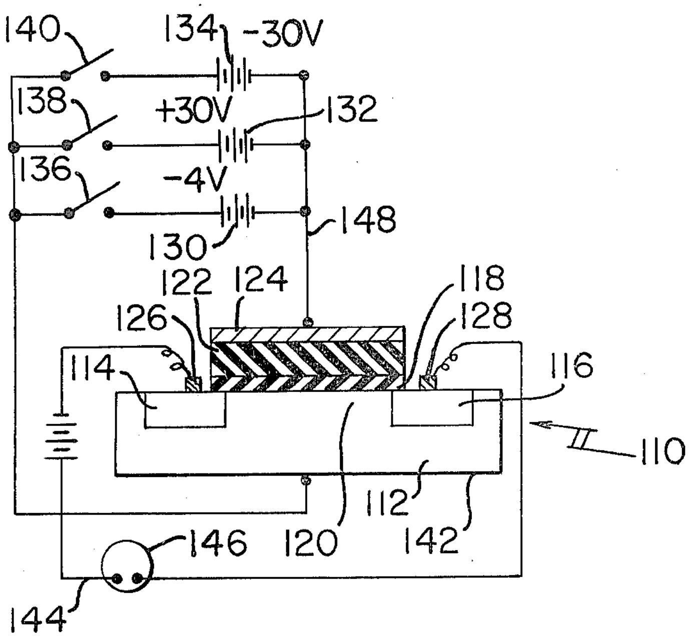
FIG. 2 is a schematic of a test procedure for a semiconductor device.

To illustrate the benefits of this novel processing technique two IGFETs, the basic structure of which is as shown in FIG. 2, were fabricated, tested and the test results evaluated. The IGFETs were made in exactly the same manner except that one, embodying the teachings of this invention, was fabricated employing the process step of purging the reactor chamber 52 and heat treating the surface of the oxide layers with an ammonia enriched gas before depositing the silicon nitride layer. The fabricated test IGFETs 110 comprised a body 112 of n-type silicon semiconductor material. P-type conductivity source and drain regions 114 and 116 respectively were formed by boron diffusion techniques embodying an oxide mask. The reactor chamber was purged for approximately 2 minutes with nitrogen gas flowing at 24 liters per minute, the body 112 having been raised to a temperature of 600° C ± 2° C. Oxygen gas having a purity of 99.999% was introduced into the nitrogen gas stream at a flow rate of 1.2 liters per minute. The oxygen-nitrogen gas mixture flow was continued for approximately 20 minutes. A layer 118 of silicon oxide of approximately 20 A to 30 A in thickness was grown on the surface of the channel region 120.

A silicon nitride layer 122 was deposited on one processed body 112 by immediately introducing a gaseous mixture of silane and ammonia into the chamber 52 and raising the body 112 to a temperature of 750° C ± 5° C after stopping the growth of the oxide layer 118. The gaseous mixture comprised nitrogen, ammonia and silane. The flow of the gaseous mixture continued for approximately 3 minutes until a layer 122 of silicon nitride of approximately 750 A in thickness had been deposited.

The second body 112 was processed in accordance with the teachings of this invention. After growing the layer 118 of silicon oxide, the oxygen flow of gases was cut off and ammonia gas was caused to flow through the reactor chamber 52 over and about the exposed surfaces of the processed body 112, particularly the surfaces of the oxide layer 118. Simultaneously the temperature of the body 112 was raised to 750° C ± 5° C and flow of ammonia was initiated and maintained for 10 minutes to heat treat the silicon oxide layer prior to the deposition of the silicon nitride layer. The silicon nitride layer was then deposited in exactly the same manner as the prior art device.

Both IGFET devices were then processed further to provide an electrical contact or gate electrode 124, and electrical contacts 126 and 128 to the respective source and drain regions 114 and 116 to complete the IGFETs.

Among the evaluation tests performed on the two devices was an evaluation and comparison of the switching times for each IGFET. Each IGFET device was connected into a test circuit means 148 which comprised a plurality of potential sources 130, 132 and 134 connected in parallel to each other. The cathode of each potential source 130, 132 and 134, was connected via a common terminal to the gate electrode 124. The anode of each potential source 130, 132 and 134 were connected via respective switches 136, 138 and 140 and a common terminal to the bottom surface 142 of the IGFET to be evaluated. Circuit means 144 including an ammeter 146 to detect current flow therein connects the source and drain regions.

As fabricated, the IGFETs were designed to conduct between the source and drain regions 114 and 116 respectively when a test voltage of −4 volts was applied from potential source 130 via the switch 136 when closed. The threshold voltage of the IGFET is designed for −3 volts when probed or tested at −4 volts. This condition is the "on" or "one" state of the IGFET.

The switching voltage employed in the circuit 148 was −30 volts supplied by potential source 132 via switch 138 when closed. Application of the switching voltage changes the threshold voltage (becomes more negative) nonlineally over a period of time or for the duration of the switching pulse and reaches a plateau. Application of the −4 volt potential does not provide conduction between the source and drain regions 114 and 116. The IGFET is now in an "off" or "zero" state. The IGFET was returned to the "one" state, a threshold voltage of −3 volts, by application of +30 volts from potential source 134 via switch 140 in the circuit means 148.

Figure 3:
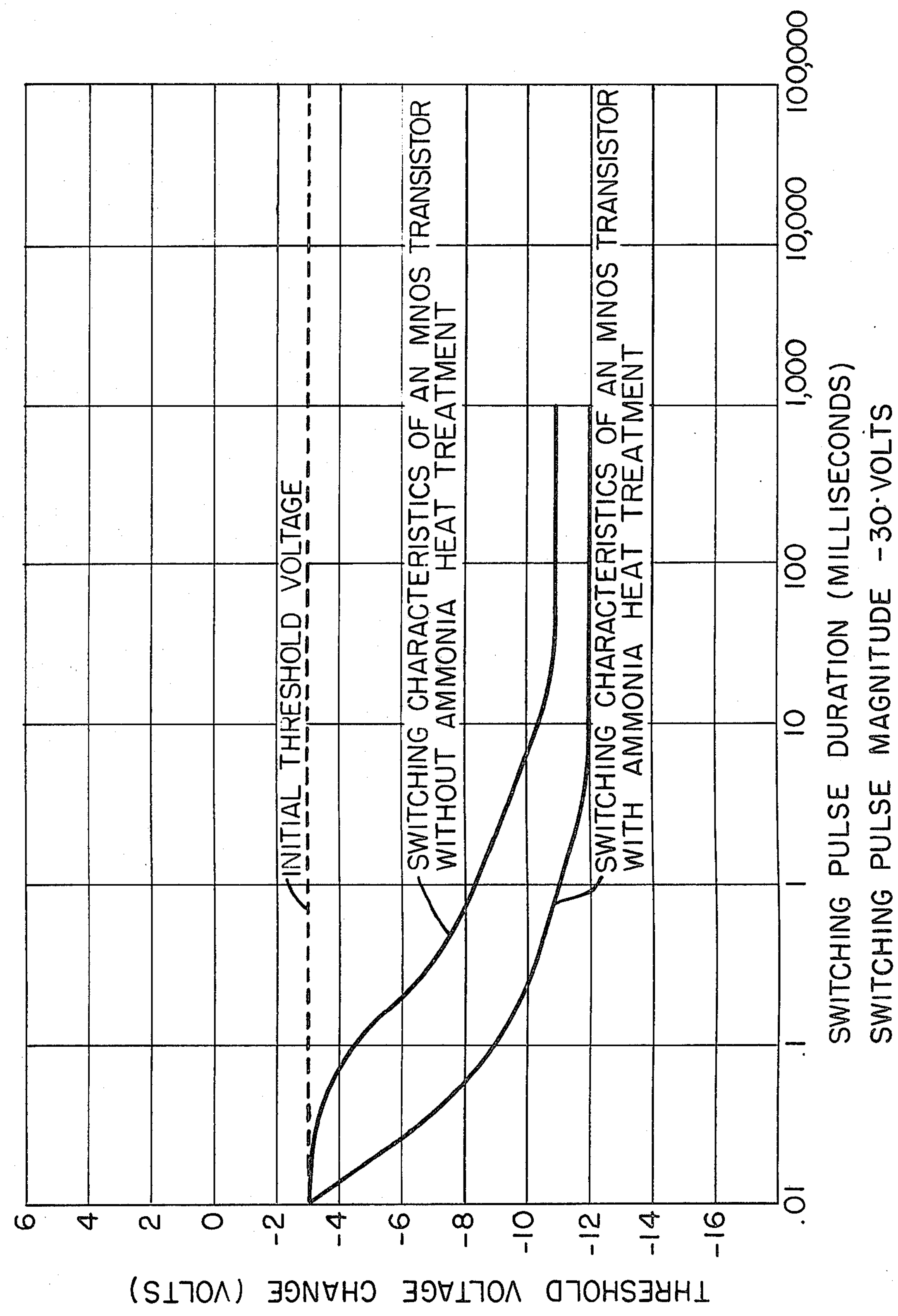
FIG. 3 is a graph of the threshold voltage charge, in volts, with respect to switching pulse duration, in milliseconds.

The two IGFETs were tested electrically and the threshold voltage change as measured in volts for each device was plotted versus the switching pulse duration in milliseconds as illustrated in FIG. 3. The plotted test data for the prior art IGFET is the upper curve. The plotted test data for the IGFET embodying the ammonia enriched atmosphere heat treatment immediately after oxide growth and immediately before nitride growth is the lower curve. The initial threshold voltage for both IGFET devices was −3 volts.

The IGFET made in accordance with the teachings of this invention exhibited a very high increase in switching speed relative to the prior art device. The IGFETs of this invention have a switching speed which is at least 10 times greater than the prior art IGFETs.

What is claimed is:

1. In a process for fabricating a silicon oxide-silicon nitride semiconductor memory device comprising:

thermally growing a layer of relatively thin silicon oxide at a temperature below approximately 1100° C in a dilute oxygen atmosphere on a selected surface area of a body of semiconductor material;

heating the layer of silicon oxide to a given temperature;

subjecting the layer of silicon oxide to an ammonia enriched atmosphere for a period of time only sufficient to remove substantially all the oxygen absorbed on the surface of the silicon oxide layer; and depositing a layer of silicon nitride on the oxygen free surface of the heat treated silicon oxide layer immediately thereafter.

2. The process of claim 1 wherein:

the ammonia enriched atmosphere is established prior to the deposition of the nitride layer and is caused to flow over and about the silicon oxide layer for a predetermined period of time before initiating the deposition of the silicon nitride layer.

3. The process of claim 1 wherein:

the given temperature is that temperature at which the nitride layer is to be grown.

4. The process of claim 2 wherein:

the ammonia enriched atmosphere is derived from a nitrogen compound which comprises the gaseous mixture to deposit the layer of silicon nitride.

5. The process of claim 4 wherein:

the nitrogen compound is one selected from the group consisting of ammonia and hydrazine.

6. The process of claim 2 wherein:

the ammonia enriched atmosphere is derived from a nitrogen compound selected from the group consisting of ammonia and hydrazine.

7. The process of claim 2 and including the process steps prior to the growing of the oxide layer of:

disposing the body within a reactor chamber;

flushing the reactor chamber and at least a selected surface area of the body with an inert gas for a predetermined period of time; and heating the body to an elevated temperature at which the silicon oxide layer is to be grown.

8. The process of claim 7 wherein:

the ammonia enriched atmosphere is derived from a nitrogen compound selected from the group consisting of ammonia and hydrazine.

9. The process of claim 7 wherein:

the ammonia enriched atmosphere is derived from a nitrogen compound which comprises a gaseous mixture for growing the layer of silicon nitride.

10. The process of claim 9 including the process step immediately after growing the silicon oxide layer and prior to the ammonia heat treating step of:

purging the reactor chamber with an inert gas for a predetermined period of time.

11. The process of claim 8 wherein:

the layer of silicon oxide is grown by oxidizing the material comprising the body of semiconductor material in a gaseous atmosphere comprising oxygen.

12. The process of claim 11 wherein:

the heat treating of the silicon oxide surface is continued for at least five minutes.

13. The process of claim 12 wherein:

the layer of silicon oxide is heated at a temperature about 750° C ± 5° C.

14. The process of claim 13 wherein:

the heating of the layer of silicon oxide is continued for approximately 10 minutes.

* * * * *